United States Patent
Shimizu et al.

[11] Patent Number: 5,904,223
[45] Date of Patent: May 18, 1999

[54] ELECTRIC POWER STEERING SYSTEM

[75] Inventors: Yasuo Shimizu; Hiroyuki Tokunaga, both of Saitama-ken, Japan

[73] Assignee: Honda Giken Kogyo Kabushiki Kaisha, Tokyo, Japan

[21] Appl. No.: 08/757,796

[22] Filed: Nov. 27, 1996

[30] Foreign Application Priority Data

Dec. 1, 1995 [JP] Japan .................................. 7-337770

[51] Int. Cl.$^6$ ..................................................... B62D 5/04
[52] U.S. Cl. ............................ 180/443; 180/446; 701/41
[58] Field of Search ................................. 180/443, 446, 180/412, 413, 422; 303/150, 146, 148; 701/41; 364/424.05

[56] References Cited

U.S. PATENT DOCUMENTS

| | | | |
|---|---|---|---|
| 4,669,569 | 6/1987 | Suzuki et al. ........................... | 180/249 |
| 4,685,528 | 8/1987 | Suzuki et al. ........................... | 180/446 |
| 4,936,406 | 6/1990 | Tezuka et al. .......................... | 180/249 |
| 4,939,653 | 7/1990 | Tsurumiya et al. ................. | 364/424.05 |
| 4,940,103 | 7/1990 | Momiyama ............................. | 180/132 |
| 4,964,481 | 10/1990 | Sano et al. ............................. | 180/140 |
| 4,979,114 | 12/1990 | Oshita et al. ........................ | 180/446 X |
| 5,086,859 | 2/1992 | Takahashi et al. ....................... | 180/446 |
| 5,089,967 | 2/1992 | Haseda et al. ..................... | 364/426.02 |
| 5,182,711 | 1/1993 | Takahashi et al. .................. | 180/446 X |
| 5,198,981 | 3/1993 | Collier-Hallman et al. ......... | 180/446 X |
| 5,261,503 | 11/1993 | Yasui ..................................... | 180/142 |
| 5,411,322 | 5/1995 | Breen ................................. | 303/150 X |
| 5,411,325 | 5/1995 | Tanaka et al. ........................... | 303/150 |
| 5,460,235 | 10/1995 | Shimizu ................................... | 180/446 |
| 5,469,357 | 11/1995 | Nishimoto ........................... | 180/446 X |
| 5,481,457 | 1/1996 | Yamamoto et al. ................ | 180/446 X |
| 5,596,252 | 1/1997 | Shimizu et al. .................... | 180/446 X |
| 5,668,721 | 9/1997 | Chandy ................................ | 180/446 X |

*Primary Examiner*—Robert J. Oberleitner
*Assistant Examiner*—Pamela J. Lipka
*Attorney, Agent, or Firm*—Skjerven, Morrill, MacPherson, Franklin & Friel; Alan H. MacPherson

[57] ABSTRACT

In an electric power steering system, a road surface reaction applied to a steering mechanism is estimated from a voltage and an electric current applied to an electric actuator, and a steering torque. Because the road surface reaction provides a useful data for assessing the condition of the road surface, it is possible to optimally control various control systems which depends on the condition of the road surface. In particular, a frictional coefficient between a road surface and a tire of the vehicle can be estimated according to a steering angle and the road surface reaction, for instance by comparing the estimated road surface reaction with a reference road surface reaction which is computed from a set of standard conditions. Thus, the road surface reaction and the road frictional coefficient can be obtained during a normal steering action by using functions which are normally provided in the electric power steering system. By knowing the current road surface condition, an optimum steering assist action can be executed according to each particular road surface condition, and can substantially reduce the effort required by the vehicle operator to steer the vehicle under all conditions.

3 Claims, 9 Drawing Sheets

ELECTRIC POWER STEERING SYSTEM

TECHNICAL FIELD

The present invention relates to an electric power steering system employing an electric actuator to provide an assist steering torque which reduces the effort required for a vehicle operator to steer the vehicle, and in particular to an electric power steering system incorporated with means for estimating the frictional coefficient between the road surface and the wheel.

BACKGROUND OF THE INVENTION

Electric power steering systems are increasingly more preferred for motor vehicles of relatively compact design not only for their compactness but also a certain freedom of control they provide. Referring to FIG. 12 showing a typical conventional electric power steering system, this system comprises a steering shaft 2 which is integrally attached to a steering wheel 1, and a pinion 4 of a rack and pinion mechanism which is connected to the lower end of the steering shaft 2 via a connecting shaft 3 having a pair of universal joints 3a and 3b at its either axial end. The rack and pinion mechanism further comprises a rack 8 which can move laterally of the vehicle body and meshes with the pinion 4. The two ends of the rack 8 are connected to knuckle arms 7 of the right and left front wheels 6 via tie rods 5, respectively.

This steering system additionally comprises an electric motor 10 which is coaxially disposed with respect to the rack 8, a ball-nut mechanism 10a for converting the rotational torque of the electric motor 10 to the thrust of the rack 8, a manual steering torque sensor 11 for detecting the manual steering torque Ts applied to the steering wheel 1, a steering angle sensor 12 which detects the angular position of the steering shaft 2 or a steering angle θs, and an assist torque control unit 13 for controlling the output of the electric motor 10 according to the detected values of Ts and θs.

Referring to FIG. 13, the assist torque control unit 13 comprises a target assist torque generating unit 14 which determines an assist torque T0 which the electric motor 10 should produce, and a motor drive unit 15 which controls the electric motor 10 according to this target assist torque T0.

According to such a conventional power steering system, when the vehicle is traveling over a slippery (low-$\mu$) road, for instance due to a snow accumulation or freezing, because of a sharp reduction in the steering reaction from the road surface, the assist torque tends to be excessive. Therefore, the force required to turn the steering wheel is so reduced that the vehicle operator is required to be cautious not to excessively steer the vehicle. This is known to cause a substantial stress to the vehicle operator.

To avoid the problems which may arise because of the tendency to excessively steer the vehicle on a low-$\mu$ road surface, it is conceivable to control the magnitude of the assist torque according to the frictional coefficient of the road surface. However, to accomplish this goal, a separate sensor for detecting the frictional coefficient between the road surface and the tire becomes necessary. According to one known method for detecting the road frictional coefficient, the frictional coefficient is computed from a difference between the rotational speeds of the front and rear wheels. However, this method requires speed sensors for both front and rear wheels, and therefore tends to be complex and expensive. Furthermore, the frictional coefficient of the road surface can be detected only when one of the wheels is slipping due to acceleration or deceleration.

Reference should be made to copending U.S. Pat. No. 5,729,107 issued Mar. 17, 1998, based on Japanese patent application No. 7-245408 filed Aug. 29, 1995, which discloses a device for controlling an electric power steering system according to an estimated road frictional coefficient, and the contents of that patent are incorporated herein by reference.

BRIEF SUMMARY OF THE INVENTION

In view of such problems of the prior art, a primary object of the present invention is to provide a system which allows the condition of the road surface to be estimated when the vehicle is being steered in a normal fashion.

A second object of the present invention is to provide a system which allows the condition of the road surface to be estimated with a simple arrangement and at a relatively high precision.

A third object of the present invention is to provide an electric power system which can adapt itself to the condition of the road surface without requiring any expensive external arrangement.

According to the present invention, these and other objects can be accomplished by providing an electric power steering system for a vehicle, comprising: a steering system including a steering wheel and a steering mechanism for transmitting a steering torque applied to the steering wheel to steerable wheels; steering torque sensor for detecting the manual steering torque applied to the steering wheel; an electric actuator to providing an assist steering torque to the steering mechanism; electric current detecting means for detecting electric current supplied to the electric actuator; control means for controlling an output of the electric actuator according to signals from the steering torque sensor and the electric current detecting means; electric voltage detecting means for detecting electric voltage applied to the electric actuator; and road surface reaction estimating means for estimating a road surface reaction applied to the steering mechanism according to signals from the electric voltage detecting means, the steering torque sensor, and the electric current detecting means.

Because the road surface reaction provides a useful data for assessing the condition of the road surface, it is possible to optimally control various control systems which depends on the condition of the road surface by using this data. In particular, a frictional coefficient between a road surface and a tire of the vehicle can be estimated according to a steering angle and the road surface reaction. For instance, the road frictional coefficient can be estimated by comparing the estimated road surface reaction with a reference road surface reaction which is computed from a set of standard conditions.

When the road surface reaction or the road frictional coefficient is determined to be small, it is advantageous to diminish an assist steering torque which the electric power steering system normally provides. Thereby, the vehicle operator is prevented from excessively steering the vehicle on a low-$\mu$ road surface.

Alternatively, a maximum steering angle which can be taken without causing any excessive side slip angle can be estimated according to the estimated road frictional coefficient, and when the steering angle sensor detects a steering angle greater than the maximum steering angle, a resistance to a manual effort to turn the steering wheel may be increased by using suitable damping means. Thereby, the vehicle operator is again prevented from excessively steering the vehicle on a low-$\mu$ road surface.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
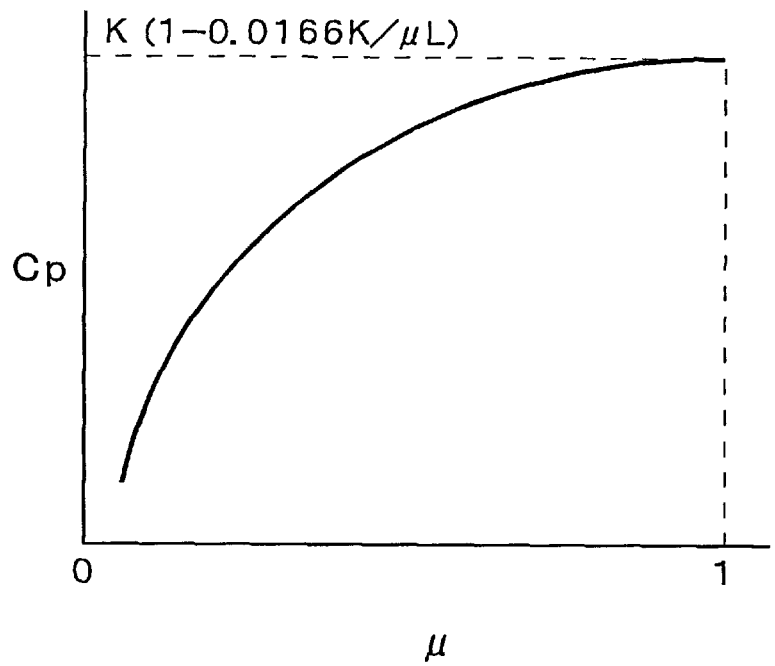
FIG. 1 is a graph showing the relationship between the cornering power and the road frictional coefficient.

The cornering power Cp of a tire can be computed using FIALA's equation (second term approximation) as given in the following:

$$Cp=K(1-0.01666K/\mu L)$$

where K is the cornering stiffness, $\mu$ is the frictional coefficient between the tire and the road surface, and L is the vertical load of the wheel. In other words, the tire cornering power Cp is reduced on a low-$\mu$ road surface as shown in FIG. 1. Similarly, the rack reaction from the road surface for a given steering angle is reduced. Therefore, by comparing the actual rack reaction for a given steering angle with a reference rack reaction which is expected to be produced on a standard reference road surface and which can be computed according to each given steering angle and frictional coefficient, it is possible to estimate the frictional coefficient between the tire and the road surface.

The method for estimating the actual rack reaction Frc is described in the following. The output shaft torque Tm of the electric motor 10 for producing the assist torque Tm is given by the following equation.

$$Tm = Kt \cdot Im - Jm \cdot \theta m'' - Cm \cdot \theta m' \pm Tf$$

where Kt is the torque constant of the electric motor, Im is the electric current of the motor, Jm is the moment of inertia of the rotating part of the electric motor, $\theta m'$ is the angular speed of the motor, $\theta m''$ is the angular acceleration of the motor, Cm is the damping coefficient of the motor, and Tf is the frictional torque.

The terms corresponding to the damping, inertia and friction of the steering shaft, and the friction term of the motor may be disregarded as they are sufficiently small. Then, the static balance of forces acting on the rack shaft 8 can be approximated by the following equation:

$$\begin{aligned} Fr &= Fs + Fm \\ &= Ts/rp + N(Kt \cdot Im - Jm \cdot \theta m'' - Cm \cdot \theta m') \end{aligned}$$

where Fr is the rack reaction from the road surface, Fs is the thrust applied by the pinion 4 to the rack 8, Fm is the thrust applied by the motor 10 to the rack 8, Ts is the manual steering torque applied to the steering shaft 2, rp is the effective radius of the pinion 4, and N is the output gear ratio of the electric motor 10.

The angular speed of the motor $\theta m'$ is obtained either by differentiating the steering angle $\theta s$ or from the electromotive force of the motor according to the following equation:

$$\theta m' = (Vm - Im \cdot Rm)/Km$$

where Vm is the voltage of the electric motor, Rm is the electric resistance of the motor, and Km is the inductive voltage constant of the motor.

The angular speed of the motor $\theta m'$ is not exactly equal to the angular speed of the steering angle $\theta s'$, and can be more precisely obtained according to the following equation:

$$\theta m' = \theta s' - Ts'/Ks$$

where Ks is the spring constant of the steering torque sensor 11, and Ts' is the time derivative of the steering torque. The angular acceleration of the motor $\theta m''$ can be obtained by differentiating the angular speed of the motor $\theta m'$ with time. It is thus possible to estimate the actual rack reaction Frc or the steering road surface reaction from the steering torque Ts, the voltage of the motor Vm, and the electric current of the motor Im.

Figure 2:
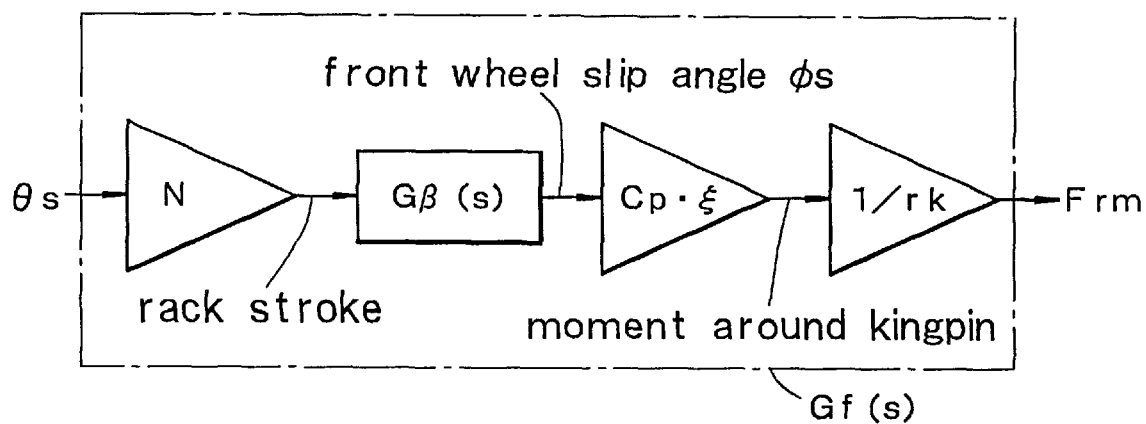
FIG. 2 is a block diagram for computing a reference road surface reaction.

An internal model for determining the actual rack reaction Frc is defined as given in the following. Referring to FIG. 2, the steering angle $\theta s$ given at the steering wheel 1 is converted into the stroke of the rack 8 at a transmission ratio N associated with the pinion 4, and a corresponding side slipping angle $\phi s$ is produced at the front wheel. The transfer function $G\beta(s)$ of the front wheel slip angle $\phi s$ with respect to the stroke of the rack shaft 8 changes with the changes in a stability factor which can be determined by the road frictional coefficient $\mu$.

By multiplying the cornering power Cp and the trail $\xi$ (the sum of the caster trail and the pneumatic trail) to the front wheel slip angle $\phi s$, the moment around the kingpin can be obtained. The cornering power Cp and the pneumatic trail change in dependence on the road frictional coefficient $\mu$ and the vertical load L on the tire. By dividing the moment around the kingpin with the knuckle arm length rk or the distance between the rotational center of the tire and the central axial line of the rack 8, the reference model rack reaction Frm can be obtained.

Thus, it can be appreciated that the response of the model rack reaction to the steering angle $\theta s$ can be expressed by a single transfer function Gf(s) which can be either theoretically defined or identified from measurements of actual vehicles.

The following describes the procedure for determining the road frictional coefficient $\mu$ according to the present invention.

Figure 3:
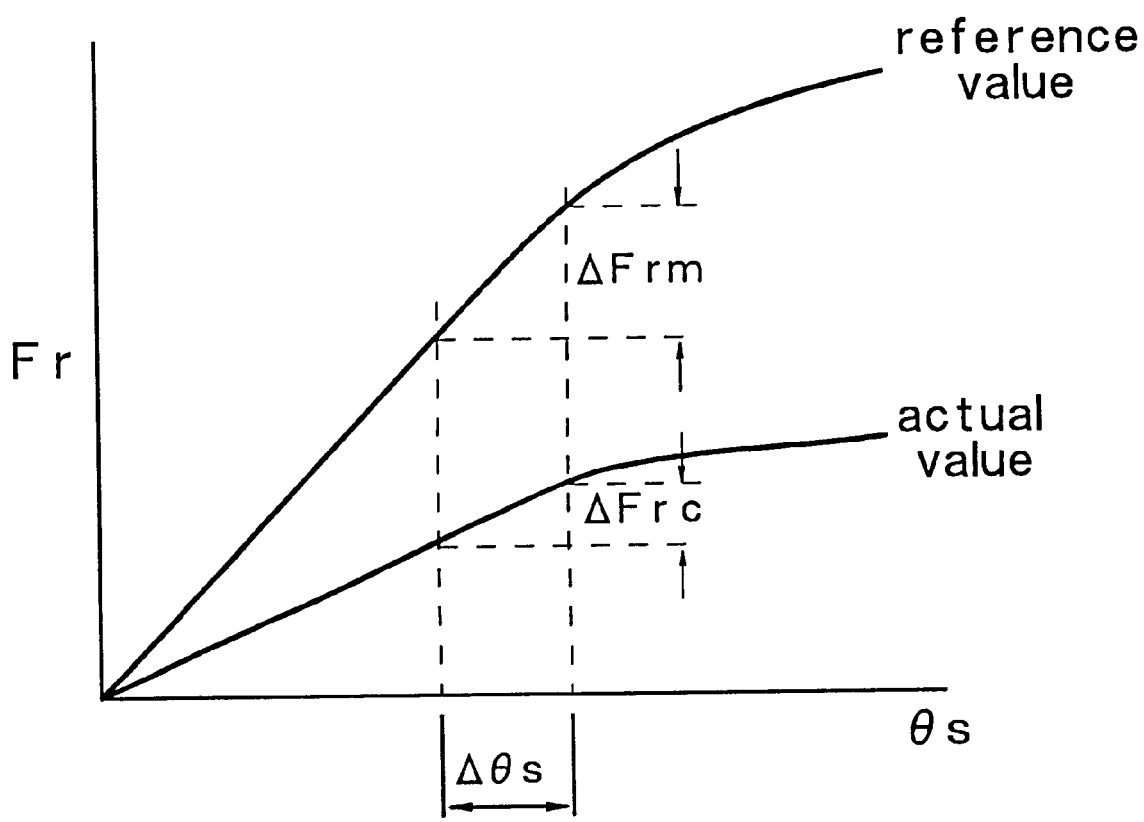
FIG. 3 is a graph showing the relationship between the steering angle and the road surface reaction.
Figure 4:
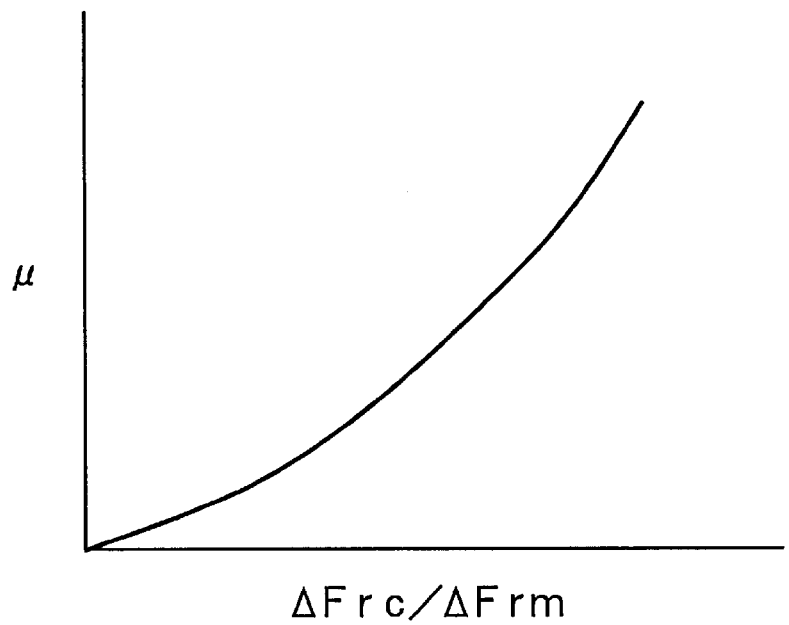
FIG. 4 is a graph showing the relationship between the ratio of the increments of the actual and reference road surface reactions to the road frictional coefficient.
Figure 5:
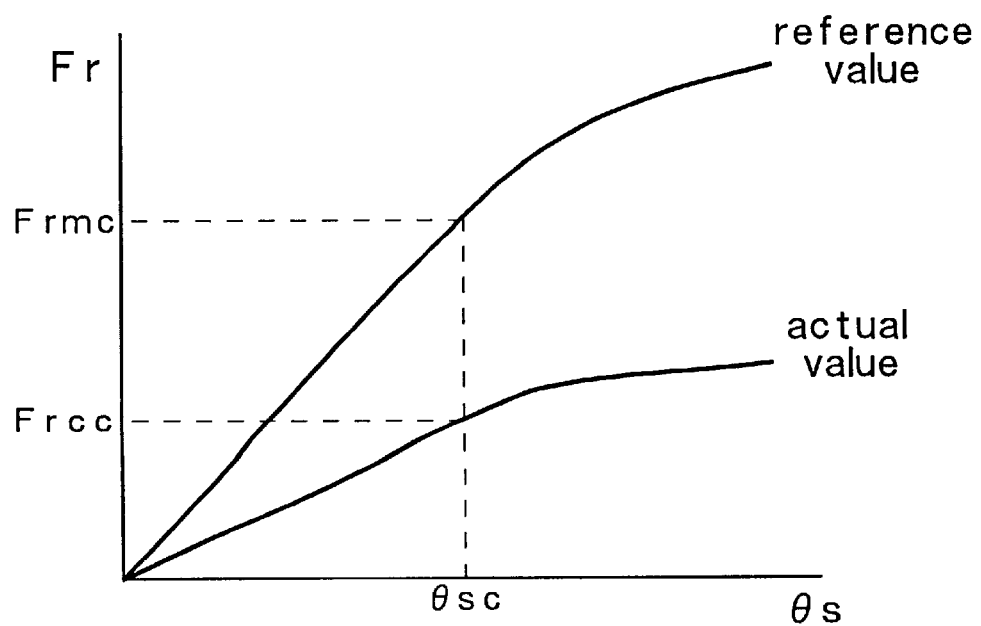
FIG. 5 is a graph showing the relationship between the steering angle and the road surface reaction.

Increments of the actual rack reaction Frc and the reference rack reaction Frm for a given increase of the steering angle θs are obtained as illustrated in FIG. 3, and on the assumption that the steering angle is within a range where the vehicle response can be considered to be linear, the road frictional coefficient μ is estimated from the ratio ΔFrc/ΔFrm of the increment of the actual rack reaction ΔFrc/Δθs to the increment of the reference rack reaction ΔFrm/Δθs by looking up a predetermined road frictional coefficient lookup table such as the one shown in FIG. 4.

It is also possible to estimate the road frictional coefficient μ according to the ratio Frcc/Frmc of the actual rack reaction Frcc to the reference rack reaction ΔFrmc at each current steering angle θsc.

Figure 6A:
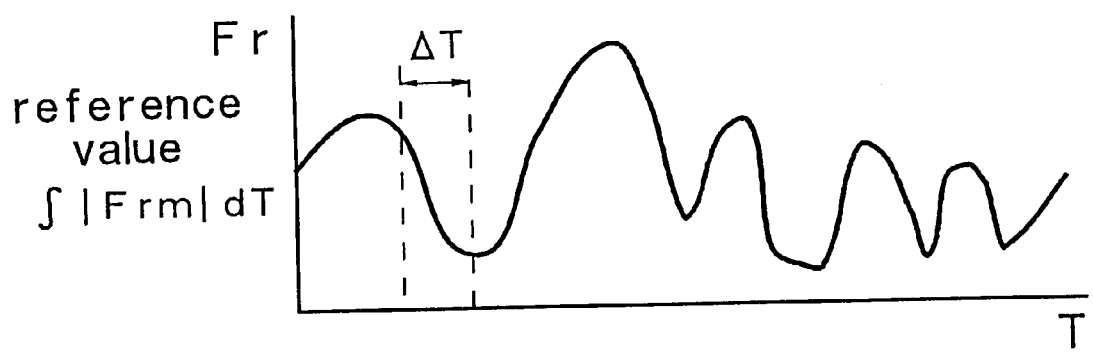
FIG. 6 shows graphs which show the effect of smoothing the estimated road surface reaction by integration.
Figure 6B:
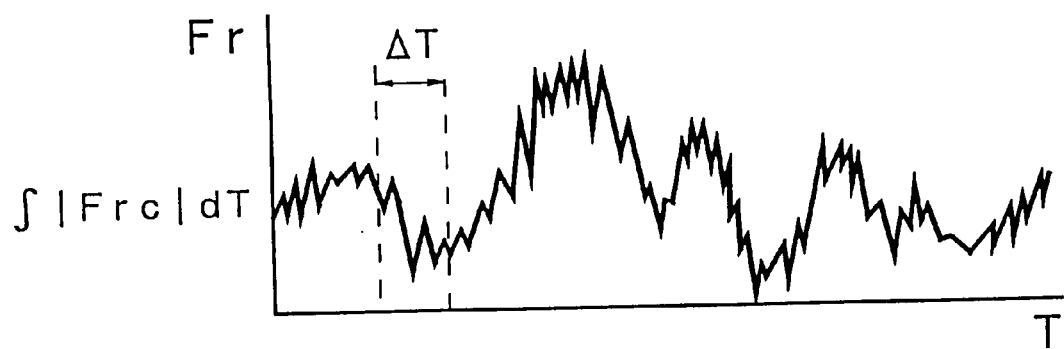

Sometimes, stable data may not be obtained when estimating the actual rack reaction Frc due to noises, a snow accumulation on the road surface, and other reasons. Therefore, by comparing the integrated value of the absolute value of the actual rack reaction and that of the reference rack reaction on the condition that the steering angle is within a prescribed range, stable data can be obtained, and a stabilization of the estimation process may be achieved as illustrated in FIG. 6A and 6B.

Figure 7:
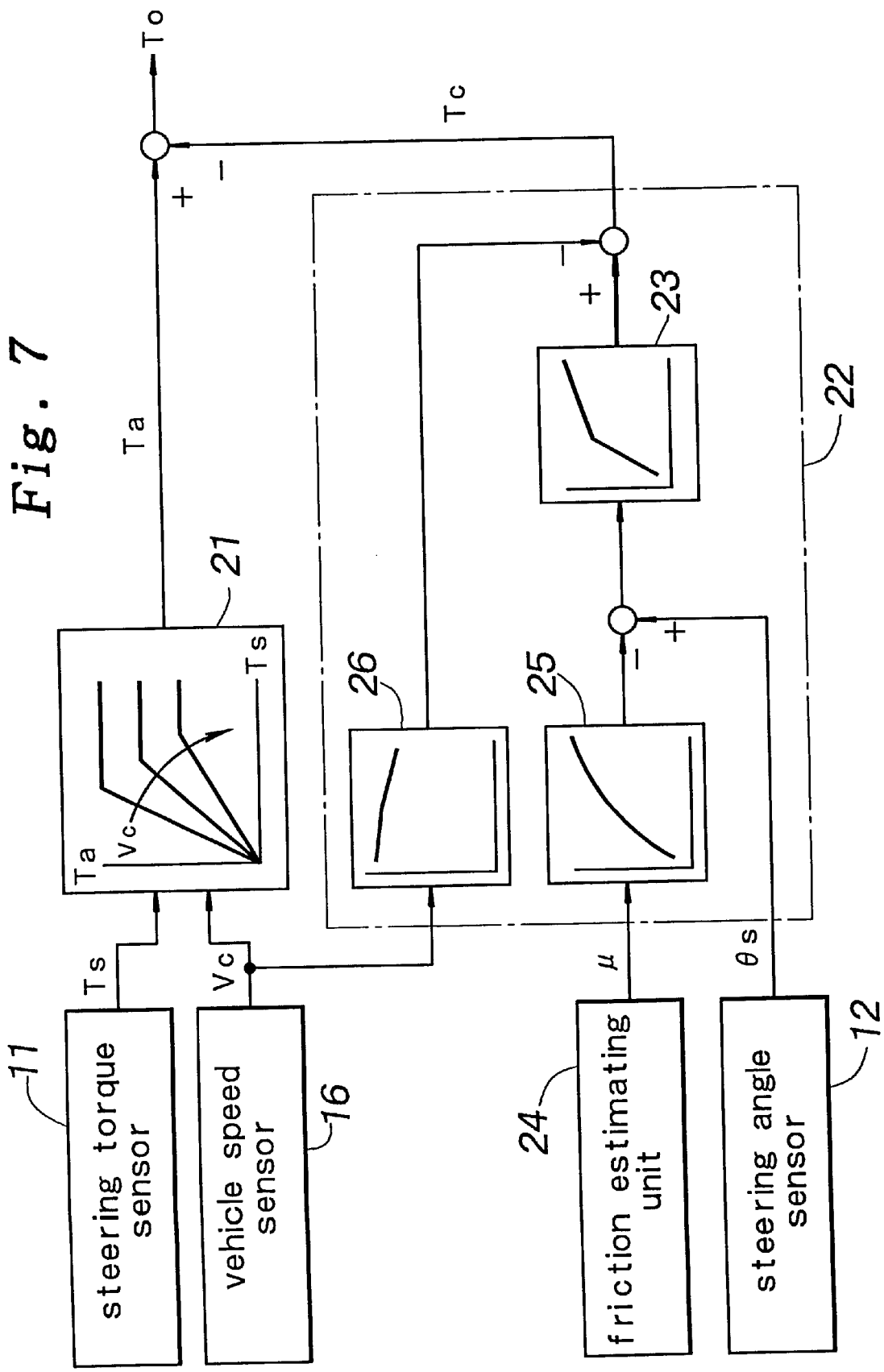
FIG. 7 is a block diagram of a first embodiment of the electric power steering system according to the present invention.

FIG. 7 shows an actual example of the application of the estimated road frictional coefficient to an assist torque control of an electric power steering system. In this example, at the stage of supplying a signal to the motor drive unit 15 of the electric power steering system which can respond to the vehicle speed over the entire range of the vehicle speed, a supplemental torque command Tc obtained by a supplemental reaction determining unit 22 is subtracted from the assist torque command Ta obtained by the assist torque determining unit 21, and the drive control of the electric motor 10 can be carried out according to the result of this arithmetic process.

The supplemental torque determining unit 22 comprises a reaction torque base map 23, a road surface offset map 25 for defining the minimum steering angle for conducting the reaction control based on the output μ from the road friction estimating unit 24, and a vehicle speed offset map 26 for changing the minimum steering angle for the reaction control according to the vehicle speed Vc detected by the vehicle speed sensor 16. When the steering angle is less than minimum steering angle for conducting the reaction control, no control action is taken.

First of all, for a given steering angle θs, the minimum steering angle for the reaction control is determined according to the estimated frictional coefficient μ of the road surface by subtracting a value looked up from the road surface offset map 25 from the minimum steering angle for the reaction control. According to the thus modified steering angle, the base torque for the supplemental reaction is obtained by looking up the reaction torque base map 23. The final supplemental torque command Tc is determined by further modifying the steering angle according to the vehicle speed Vc by looking up the vehicle speed offset map 26.

The supplemental torque command Tc which is thus determined is subtracted from the normal assist torque command Ta of the power steering system which is determined simply from the manual steering torque Ts obtained from the steering torque sensor 11 and the vehicle speed Vc obtained from the vehicle speed sensor 16, and the electric motor 10 is controlled by the thus obtained control target command. As a result, the steering assist torque is optimized in such a manner that the vehicle operator is notified of any extreme conditions, which can arise depending on the road condition, by increasing the steering torque required for turning the steering wheel, and the vehicle is prevented from being excessively steered without any deliberate intention by the vehicle operator.

Figure 8:
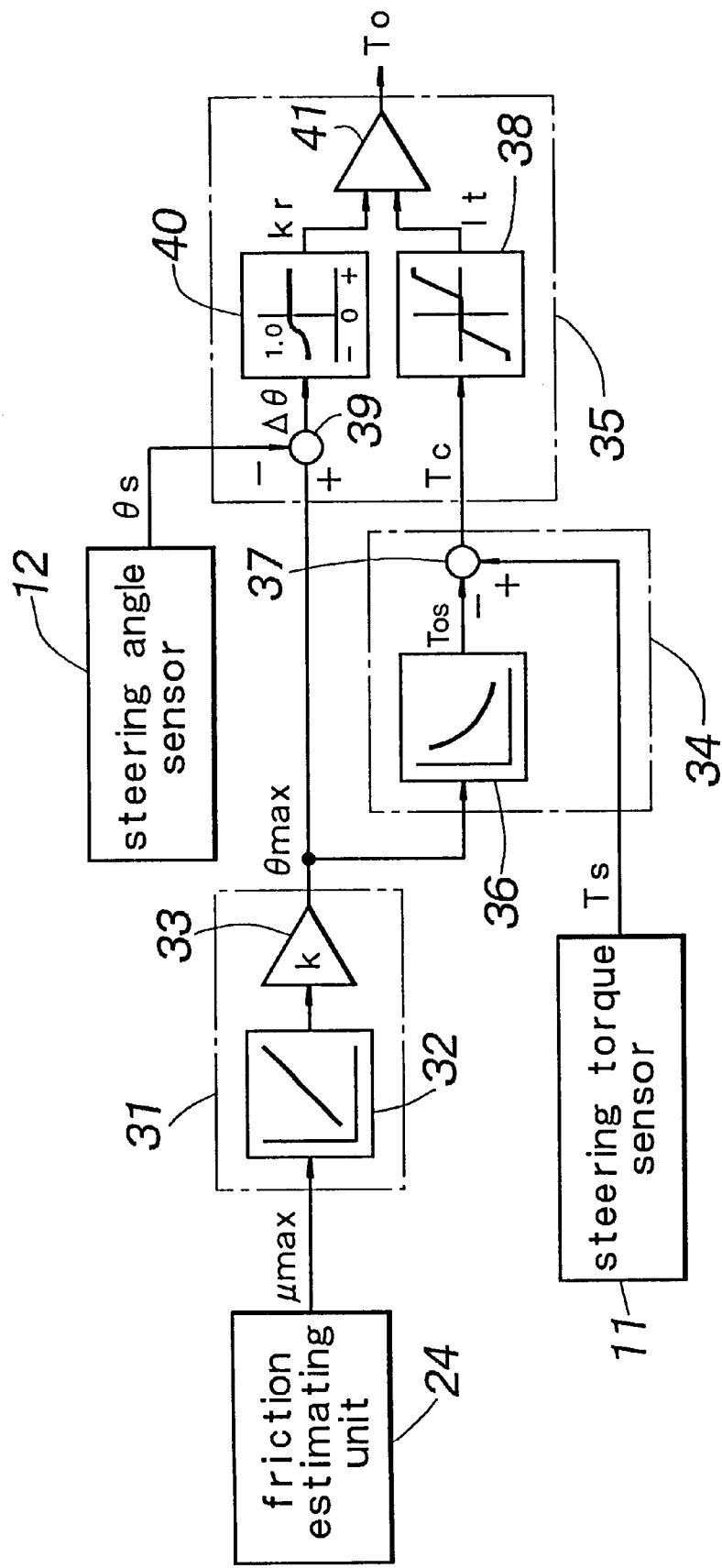
FIG. 8 is a block diagram of a second embodiment of the electric power steering system according to the present invention.
Figure 9:
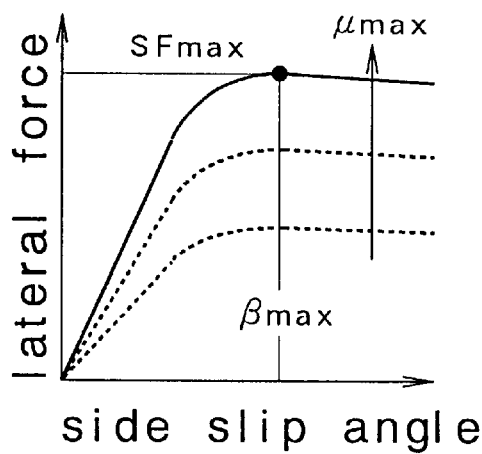
FIG. 9 is a graph showing the relationship between the lateral slip angle and the lateral force.
Figure 10:
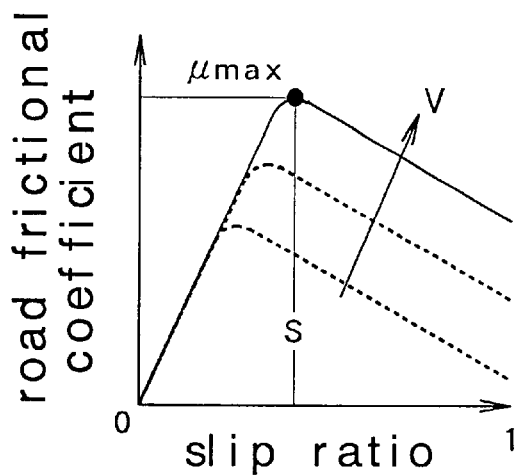
FIG. 10 is a graph showing the relationship between the slip ratio and the road frictional coefficient.
Figure 11:
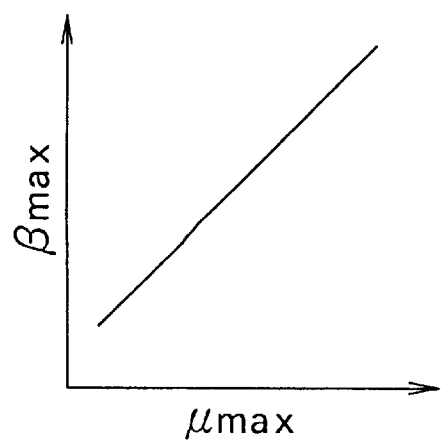
FIG. 11 is a graph showing the relationship between the maximum frictional coefficient of the road surface and the maximum side slip angle.
Figure 12:
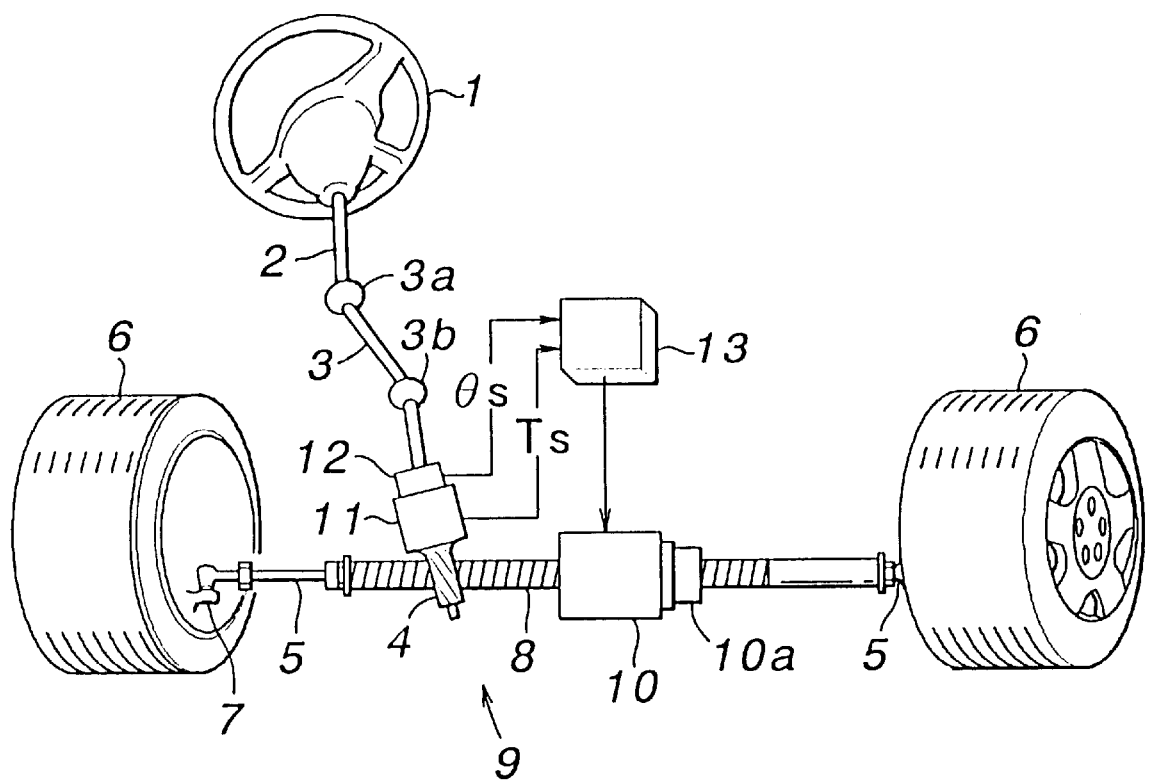
FIG. 12 is a simplified perspective view of a conventional electric power steering system to which the present invention is applied.
Figure 13:
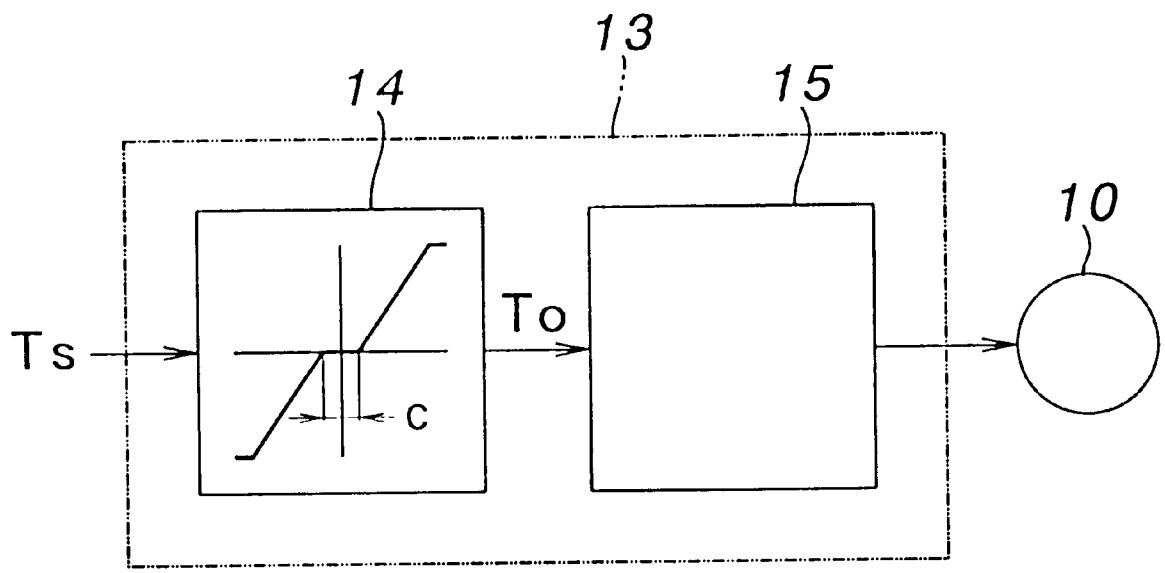
FIG. 13 is a block diagram of the control unit of FIG. 12.

FIG. 8 shows yet another embodiment of the present invention in which the maximum road frictional coefficient μmax is supplied to a maximum permissible steering angle determining unit 31. The maximum permissible steering angle determining unit 31 is incorporated with a table 32 (FIG. 11). This table 32 gives the relationship between the maximum road frictional coefficient μmax and the corresponding maximum side slip angle βmax (FIG. 11) by combining the relationship between the maximum lateral force Sfmax which the wheel can produce on a standard road surface having a standard frictional coefficient μ and the maximum side slip angle βmax (FIG. 9), and the relationship between the maximum road frictional coefficient μmax which is produced during braking/acceleration on the standard road surface and the slip ratio S (FIG. 10). Thus, by substituting the maximum road frictional coefficient μmax into the table 32, the maximum side slip angle βmax can be obtained. By multiplying suitable coefficient k at the multiplier 33 by the maximum side slip angle βmax, the maximum steering angle θmax which can be taken on the current road surface can be obtained.

The steering reaction Tc is then determined by the steering reaction determining unit 34 according to this maximum steering angle θmax and the manual steering torque Ts is detected by the steering torque sensor 11, and supplied to the output target generating unit 35. The steering reaction determining unit 34 includes an offset determining unit 36 which produces an offset Tos suitable for the required steering reaction according to the maximum steering angle θmax produced from the maximum permissible steering angle determining unit 31. The steering reaction Tc is finally obtained by subtracting the offset Tos from the output Ts of the steering torque sensor 11 at a subtractor 37.

In the output target generating unit 35, the output Tc from the steering reaction determining unit 34 is supplied to a drive signal target value map 38 to obtain a drive signal target value It. The output θmax of the maximum permissible steering angle determining unit 31 and the output θs of the steering angle sensor 12 are supplied to a deviation computing unit 39, and the obtained deviation Δθ is supplied to the correction coefficient lookup map 40. This map produces a damping coefficient Kr to reduce the assist steering torque by an amount which matches the required steering reaction when the detected steering angle θs from the steering angle sensor 12 exceeds the output θmax of the maximum permissible steering angle determining unit 31. The thus obtained drive signal target value It is multiplied by the damping coefficient Kr at a multiplier 41 to produce an output target value T0. Therefore, the vehicle operator meets some resistance in turning the steering wheel, and is warned against excessively turning the steering wheel.

The output target value T0 for the electric motor 10 is determined according to the manual steering torque Ts obtained from the steering torque sensor 11, the actual steering angle θs obtained from the steering angle sensor 12, and the maximum permissible steering angle θmax determined from the maximum road frictional coefficient μmax. Therefore, the output of the electric motor is optimally controlled by taking into account the road frictional coefficient, and the magnitude of the actual steering angle θs in relation to the maximum permissible steering angle θmax.

In addition to steering reaction control systems for a power steering system, the estimated frictional coefficient can be used in traction control systems, anti-lock brake systems, boost pressure control systems for automotive brakes, and rear-wheel steering control systems for four wheel steering vehicles. Thus, the present invention allows the road surface reaction and the road frictional coefficient to be estimated from data which can be obtained during a normal steering action by using functions which are normally provided in the electric power steering system. Therefore, the present invention allows an optimum steering assist to be conducted according to each particular road surface condition, and can substantially reduce the effort required by the vehicle operator to steer the vehicle under all conditions.

Although the present invention has been described in terms of specific embodiments thereof, it is possible to modify and alter details thereof without departing from the spirit of the present invention.

What we claim is:

1. An electric power steering system for a vehicle, comprising:

a steering system including a steering wheel and a steering mechanism for transmitting a steering torque applied to said steering wheel to steerable wheels;

a steering torque sensor for detecting said manual steering torque applied to said steering wheel;

an electric actuator for providing an assist steering torque to said steering mechanism;

an electric current detecting means for detecting electric current supplied to said electric actuator;

a control means for controlling an output of said electric actuator according to signals from said steering torque sensor and said electric current detecting means;

an electric voltage detecting means for detecting electric voltage applied to said electric actuator;

a road surface reaction estimating means for estimating a road surface reaction applied to said steering mechanism according to signals from said electric voltage detecting means, said steering torque sensor, and said electric current detecting means;

a steering angle sensor for detecting a steering angle of said steering mechanism, and a road frictional coefficient estimating means for estimating a frictional coefficient between a road surface and a tire of the vehicle according to signals from said steering angle sensor and said road surface reaction estimating means; and wherein said road frictional coefficient is estimated by comparing said estimated road surface reaction with a reference road surface reaction which is computed from a set of standard conditions.

2. An electric power steering system for a vehicle, comprising:

a steering system including a steering wheel and a steering mechanism for transmitting a steering torque applied to said steering wheel to steerable wheels;

a steering torque sensor for detecting said manual steering torque applied to said steering wheel;

an electric actuator for providing an assist steering torque to said steering mechanism;

an electric current detecting means for detecting electric current supplied to said electric actuator;

a control means for controlling an output of said electric actuator according to signals from said steering torque sensor and said electric current detecting means, wherein said control means is adapted to diminish said assist steering torque when said road frictional coefficient estimated by said road frictional coefficient estimating means is lower than a standard reference value;

an electric voltage detecting means for detecting electric voltage applied to said electric actuator;

a road surface reaction estimating means for estimating a road surface reaction applied to said steering mechanism according to signals from said electric voltage detecting means, said steering torque sensor, and said electric current detecting means; and a steering angle sensor for detecting a steering angle of said steering mechanism, and a road frictional coefficient estimating means for estimating a frictional coefficient between a road surface and a tire of the vehicle according to signals from said steering angle sensor and said road surface reaction estimating means.

3. An electric power steering system for a vehicle, comprising:

a steering system including a steering wheel and a steering mechanism for transmitting a steering torque applied to said steering wheel to steerable wheels;

a steering torque sensor for detecting said manual steering torque applied to said steering wheel;

an electric actuator for providing an assist steering torque to said steering mechanism;

an electric current detecting means for detecting electric current supplied to said electric actuator;

a control means for controlling an output of said electric actuator according to signals from said steering torque sensor and said electric current detecting means;

an electric voltage detecting means for detecting electric voltage applied to said electric actuator;

a road surface reaction estimating means for estimating a road surface reaction applied to said steering mechanism according to signals from said electric voltage detecting means, said steering torque sensor, and said electric current detecting means;

a steering angle sensor for detecting a steering angle of said steering mechanism, and a road frictional coefficient estimating means for estimating a frictional coefficient between a road surface and a tire of the vehicle according to signals from said steering angle sensor and said road surface reaction estimating means; and maximum steering angle determining unit for computing a maximum steering angle which can be taken without causing any excessive side slip angle according to said estimated road frictional coefficient, and damping means for increasing a resistance to a manual effort to turn said steering wheel when said steering angle sensor detects a steering angle greater than said maximum steering angle.

* * * * *